(12) United States Patent
Vaananen

(10) Patent No.: US 6,958,590 B1
(45) Date of Patent: Oct. 25, 2005

(54) TEMPERATURE COMPENSATED BATTERY CHARGER CURRENT

(75) Inventor: Jarmo Antero Vaananen, Haukipudas (FI)

(73) Assignee: National Semiconductor Corporation, Santa Clara, CA (US)

( * ) Notice: Subject to any disclaimer, the term of this patent is extended or adjusted under 35 U.S.C. 154(b) by 77 days.

(21) Appl. No.: 10/713,609

(22) Filed: Nov. 13, 2003

(51) Int. Cl.$^7$ .............................................. H01M 10/46
(52) U.S. Cl. ..................................................... 320/150
(58) Field of Search ............................... 320/132, 149, 320/150

(56) References Cited

U.S. PATENT DOCUMENTS

| | | | |
|---|---|---|---|
| 5,907,238 A * | 5/1999 | Owerko et al. | 320/136 |
| 6,225,787 B1 | 5/2001 | Chen et al. | 320/150 |
| 6,271,643 B1 * | 8/2001 | Becker et al. | 320/150 |

* cited by examiner

*Primary Examiner*—Edward H. Tso
(74) *Attorney, Agent, or Firm*—Brett A. Hertzberg; Merchant & Gould PC

(57) ABSTRACT

A battery charger circuit is arranged to charge batteries in a constant current mode. A charging current flows from a power device through a sense resistor to a battery. The voltage across the sense resistor is used to measure the charging current. The temperature of the sense resistor changes either because of a change in ambient temperatures or as the result of the charging current creating thermal energy in the sense resistor. The measured charging current from the sense resistor changes because of the temperature coefficient of the sense resistor, creating inaccuracies. A temperature compensation block uses a set of controllable current mirror banks to adjust reference signals such that the effects of the temperature coefficient in the sense resistor are minimized and an accurate charging current measurement is achieved.

20 Claims, 3 Drawing Sheets

TEMPERATURE COMPENSATED BATTERY CHARGER CURRENT

FIELD OF THE INVENTION

The present invention relates to a system and method for minimizing the temperature dependence of a charging current in a battery charger system. More particularly, two controllable mirror banks and a zero dependency on absolute temperature (ZTAT) current generator are arranged to cooperate with one another to adjust a reference level associated with the charger current control loop.

BACKGROUND OF THE INVENTION

Demand for portable electronic devices is increasing each year. Example portable electronic devices include: laptop computers, personal data assistants (PDAs), cellular telephones, and electronic pagers. Portable electronic devices place high importance on total weight, size, and battery life for the devices. Many portable electronic devices employ rechargeable batteries such as Nickel-Cadmium (NiCad), Nickel-Metal-Hydride (NiMHi), Lithium-Ion (Li-Ion), and Lithium-Polymer based technologies.

An example charging system for a battery is shown in FIG. 3. As shown in FIG. 3, the charging system includes a power source (PS), a regulator (REG), and a battery (BATT). The power source (PS) includes a voltage source (VS) and a source resistance (RS). The regulator (102) includes a NMOS transistor (MREG), a PMOS transistor (MP1), an amplifier (AMP), a current level control circuit (CLC), and five resistors (RSNS, R1–R4).

In operation the power source provides a charging current (ICHG) to the battery through source resistance RS, PMOS transistor MP1, and resistor RNS. Resistors R1 and R2 form a voltage divider that provide a feedback signal to amplifier AMP. Amplifier AMP compares the feedback signal to a reference voltage (VREF) and provides a control signal to transistor MREG. Transistor MREG, amplifier AMP, and resistors R1 and R2 together operate as a shunt regulator that regulates the input voltage (VIN). The shunt regulator ensures safe charging of battery BATT by limiting the charging voltage (input voltage) similar to a zener diode. Resistor RSNS converts the charging current (ICHG) into a voltage (VISNS). Resistors R3 and R4 form another voltage divider that provide another feedback signal (VBSNS) for sensing the battery voltage. The current level control circuit (CLC) monitors the charging current from voltage VISNS and regulates the amount of charging current provided by transistor MP1. The current level control circuit (CLC) also monitors the sensed battery voltage (VBSNS) to determine a when to change the charging mode from constant current to constant voltage. Once the constant voltage mode is active, the current level control circuit (CLC) monitors the charging current to end the charging cycle when the sensed charging current drops below some predetermined level.

BRIEF DESCRIPTION OF THE DRAWINGS

Non-limiting and non-exhaustive embodiments of the present invention are described with reference to the following drawings.

DETAILED DESCRIPTION OF THE PREFERRED EMBODIMENT

Figure 1:
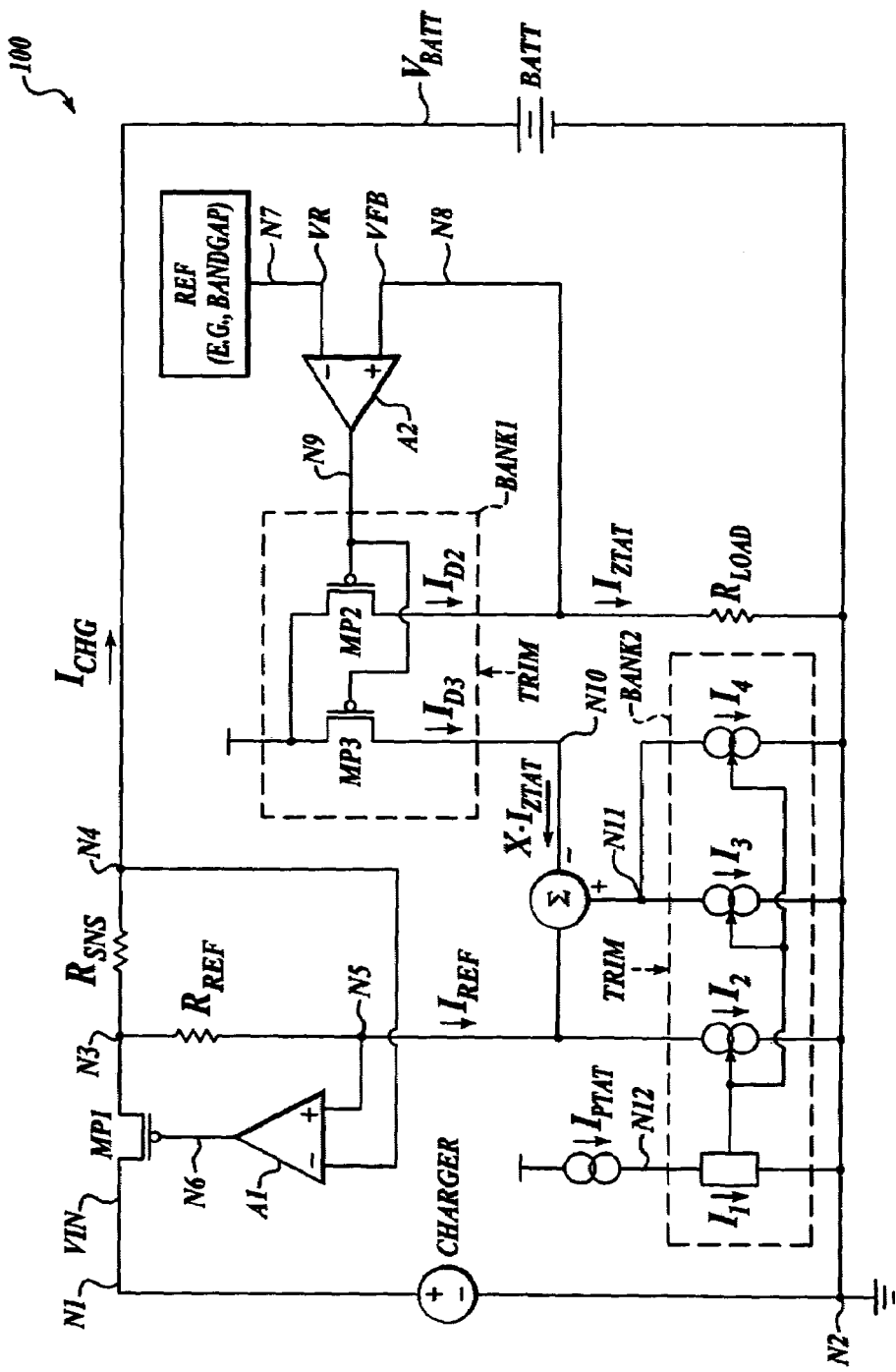
FIG. 1 is an illustration of an example temperature compensated current control circuit.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, the present invention is related to a battery charger circuit that is arranged to charge batteries in a constant current mode. A charging current flows from a power device through a sense resistor to a battery. The voltage across the sense resistor is used to measure the charging current. The temperature of the sense resistor changes either because of a change in ambient temperatures or as the result of the charging current creating thermal energy in the sense resistor. The measured charging current from the sense resistor changes because of the temperature coefficient of the sense resistor, creating inaccuracies. A temperature compensation block uses a set of controllable current mirror banks to adjust reference signals such that the effects of the temperature coefficient in the sense resistor are minimized and an accurate charging current measurement is achieved.

Battery charger circuits can be implemented as integrated circuits (ICs). The IC implementation of the battery charger includes a current limit so that the amount of charge delivered to the battery is controlled at a predictable rate.

Excessive charging currents can result in an overcharged battery. In some batteries, such as Li-Ion based batteries, overcharging can result in a catastrophic failure where the material in the battery may cause a fire or an explosive type of behavior. For these reasons as well as others, it is often preferred to operate the battery charger in a constant current mode (CCM). By maintaining a constant charging current, the battery will not heat up and the charging time is predictable.

FIG. 1 is an illustration of an example temperature compensated current control circuit (100) that is arranged according to an embodiment of the present invention. The circuit (100) includes: a charger, a battery (BATT), a p-type field effect transistor (FET MP1), a sense resistor (RSNS), a reference resistor (RREF), an amplifier (A1), and temperature compensated reference current generator circuit.

The charger is coupled between node Ni and node N2. FET MP1 is coupled between nodes N1 and N3, and has a control terminal that is coupled to node N6. Sense resistor RSNS is coupled between nodes N3 and N4. Reference resistor RREF is coupled between nodes N3 and N5. Amplifier A1 includes an input that is coupled to node N4, another input that is coupled to node N5, and an output that is coupled to node N6. Battery BATT is coupled between node N4 and node N2.

In operation, the charger applies an input voltage (VIN) across nodes N1 and N2. A charging current (ICHG) is delivered to the battery (BATT) through FET MP1 and sense resistor RSNS such that the battery charges to an output voltage (VBATT). The temperature compensated reference current generator circuit controls a reference current (IREF) that flows through the reference resistor (RREF), creating a voltage drop across the reference resistor (RREF). Amplifier A1 is arranged to operate as an error amplifier that controls the charging current (ICHG) by changing the current flow through FET MP1 in response to a comparison of the voltages at node N4 and node N5. The charging current (ICHG) is sensed with sense resistor RSNS.

Amplifier A1 and FET MP1 are arranged in a control loop that adjusts the charging current (ICHG) until the sensed voltage drop (VSNS) across the sense resistor (RSNS) equals the reference voltage (VREF) across the reference resistor (RREF). The need for temperature compensation rises when the resistivity of the sensor resistor changes with temperature. The temperature compensated reference current generator circuit dynamically adjusts the reference current to adjust the reference voltage level in a way that creates a temperature stable charging current.

The temperature compensated reference current generator circuit includes a reference circuit (REF), an amplifier (A2), a first controlled current mirror bank (BANK1), a second controlled current mirror bank (BANK2), a load resistor (RLOAD), a current summer, and a current source (IPTAT). The first controlled current mirror bank (BANK1) is illustrated as two p-type filed effect transistors (FET MP2, and FET MP3), while the second current mirror bank (BANK2) is illustrated as a current sense circuit (I1) and three dependent current sources (I2–I4).

The reference circuit (REF) is coupled to node N7, and arranged to provide a reference voltage (VREF) such as a band-gap voltage. Amplifier A2 includes an input that is coupled to node N7, another input that is coupled to node N8, and an output that is coupled to node N9. FET MP2 has an output that is coupled to node N8, a control terminal that is coupled to node N9, and is arranged to provide a current (ID2) that corresponds to IZTAT. FET MP3 has an output that is coupled to node N10, a control terminal that is coupled to node N9, and is arranged to provide a current (ID3) that corresponds to X*IZTAT. Resistor RLOAD is coupled between node N8 and node N2, and is arranged to provide a feedback voltage (VFB) at node N8. The current summer includes a negative terminal at node N10, a positive terminal at node N11, and a difference terminal at node N5. A current (IPTAT) that is proportional to absolute temperature (PTAT) current is provided to node N12. Current sense circuit I1 is coupled between node N12 and N2. Dependent current source 12 is coupled between node N5 and N2. Dependent current source 13 is coupled between node N11 and N2. Dependent current source 14 is coupled between node N11 and N2. Each of the dependent current sources (12–14) is controlled by the current sense circuit (I) in a current mirror circuit that is responsive to current IPTAT. Current mirror banks BANK1 and BANK2 can be adjusted via a TRIM signal.

Amplifier A2, FET MP2 and resistor RLOAD are arranged to operate as a ZTAT (zero dependency to absolute temperature) generator. Through the feedback operation of amplifier A2 and FET MP2, the voltage across resistor RLOAD is forced to the reference voltage (VREF). When the load resistor (RLOAD) is made of the same material as the reference resistor (RREF), the contribution of IZTAT to the reference current (IREF) has a zero temperature dependency. For example, resistors RREF and RLOAD are preferably have thermally matched temperature characteristics such that the portion of the voltage drop provided across resistor RREF from current X*IZTAT has a zero temperature dependency.

The mirroring ratio of the mirror banks can be altered by trimming. A PTAT (proportional to absolute temperature) current source is coupled to node N12. In one example, the PTAT current source is part of a temperature corrected circuit such as a band-gap circuit. In another example, the PTAT current source is a transistor that is biased by a bias signal that is derived from a temperature corrected circuit such as a band-gap circuit. The PTAT current source shares the same operation temperature with resistors RSNS, RREF, and RLOAD. The reference current (IREF) output at node N5 consists of a sum of the PTAT current and a temperature trimmed current.

The reference voltage in the battery charger for the control loop in constant current mode charging is established with the reference resistor (RREF) and a reference current (IREF). In one example, the reference resistor (RREF) is made of poly-silicon material. Because the temperature dependence in the current sense resistor (RSNS) is different from the reference resistor (RREF) a compensation method is needed. The designed compensation block changes the slope of the reference current (IREF) as a function of temperature.

In one example, the reference PTAT current is created from a PTAT voltage circuit where VPTAT is proportional to kT/q. For this example, the VPTAT circuit that includes a resistor that is made of the same material (e.g., poly-silicon) as the reference resistor (RREF), such that the voltage drop (x*KT/q) is across a resistor of the same type of material. The resulting PTAT voltage is adjusted by a multiplication factor that is determined by the ratio of the two resistor values, as well as any additional multiplication factor that is provided by the current-mirror ratios.

The temperature trimming current is generated by subtracting a ZTAT current (X*IZTAT) from a PTAT current (Y*IPTAT). The levels for IZTAT and IPTAT are the same at a nominal trimming temperature (e.g., room temperature), and unequal over temperature changes. The temperature slope factor of the current reference current (IREF) is varied by changing the mirroring ratio for IPTAT together with IZTAT.

Figure 2:
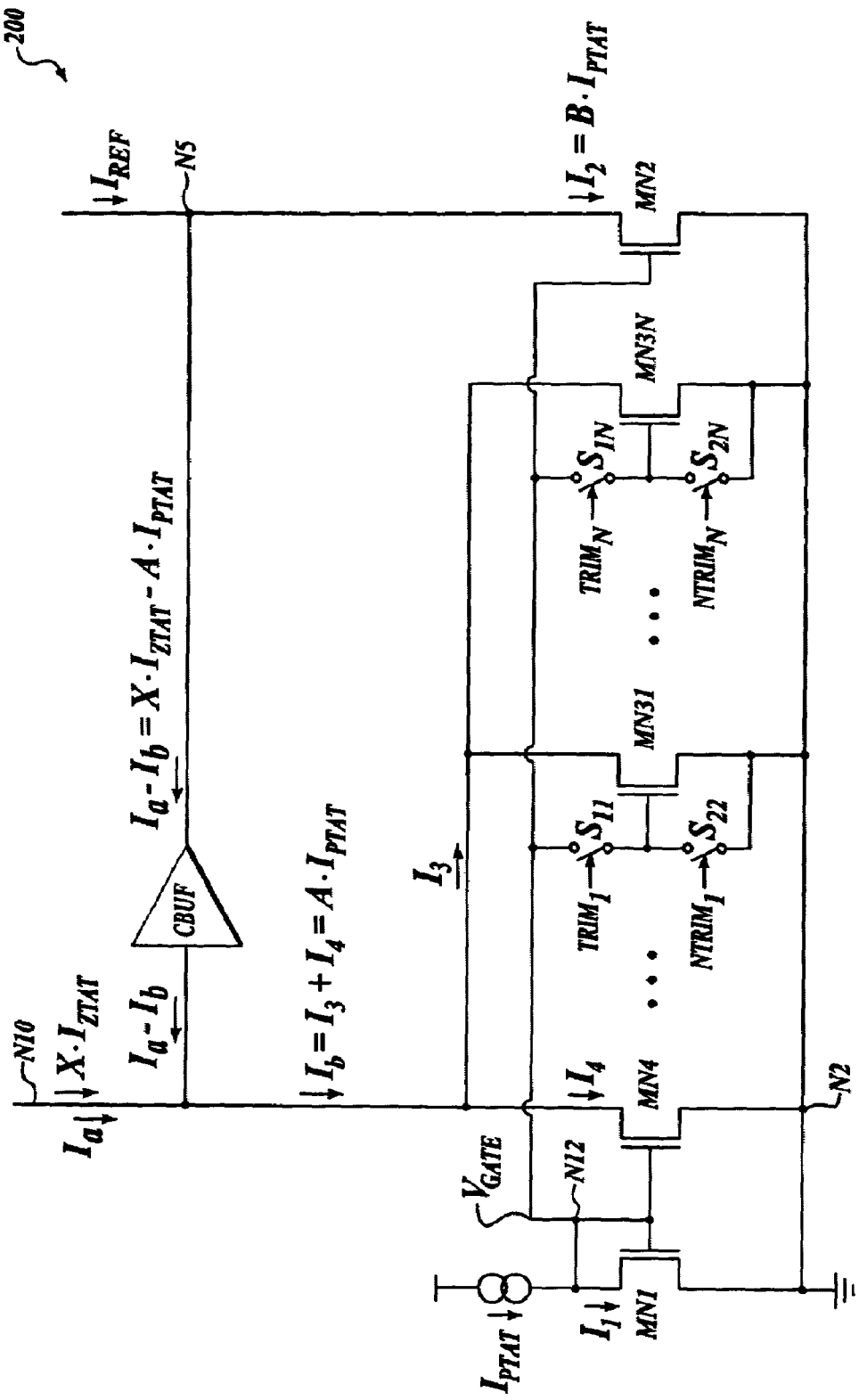
FIG. 2 is an illustration of another example temperature compensated control circuit, arranged in accordance with an aspect of the present invention.
Figure 3:
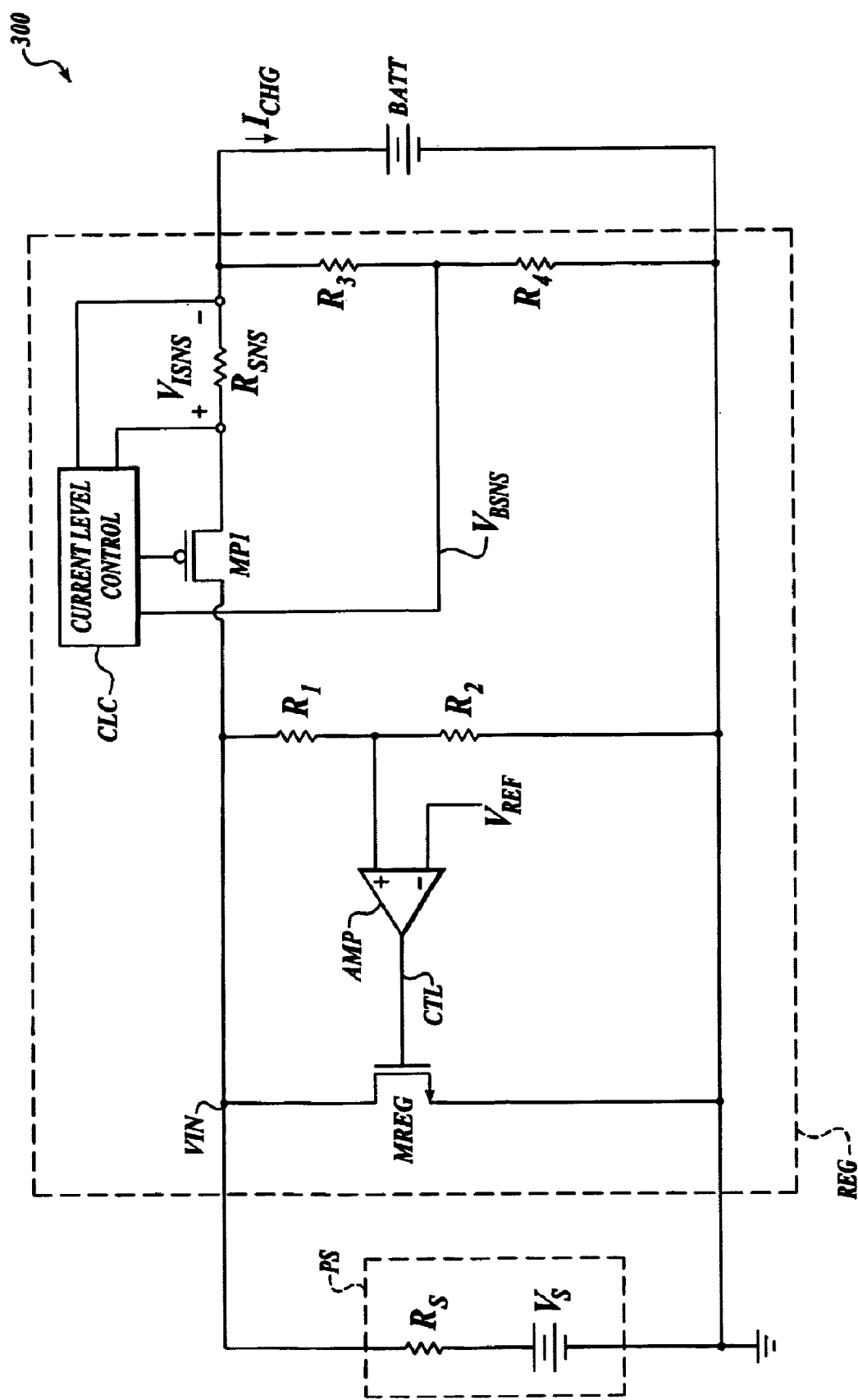
FIG. 3 is an example of a conventional battery charging system.

FIG. 2 is an illustration of another example temperature compensated control circuit (200) that is arranged in accordance with an aspect of the present invention. The circuit includes a current buffer (CBUF), a current source (IPTAT), and a bank of n-type FETs that are arranged as a current mirror bank such as BANK2 from FIG. 1.

Current buffer CBUF is coupled between node N10 and node N5. FET MN1 is configured to sense current IPTAT and provide a gate signal (VGATE) at node N12. FET MN2 has a drain that is coupled to node N5, a gate that is coupled to node N12, and a source that is coupled to node N2. FET MN3 has a drain that is coupled to node N10, a gate that is selectively coupled to either node N12 or node N2, and a source that is coupled to node N2. FET MN4 has a drain that is coupled to node N10, a gate that is coupled to node N12, and a source that is coupled to node N2.

FET MN3 is arranged as an array of n-type FETs (MN31–MN3N) that are selected in response to trim signals (TRIM1–TRIMN, NTRIM1–NTRIMN). For example, FET MN31 is selected when switch S11 is closed and switch S21 is opened, while FETMN31 is disabled when switch S11 is opened and switch S21 is closed. The switches can be controlled by trimming signals as shown in the figure, programmed by a memory such as a register, or burned using fuse links. Other fuse link and programming arrangements are contemplated to selectively disable and enable any desired one of the FETs that comprises FET MN3.

FET MN1 is ratio sized to the parallel combination of FET MN3 and FET MN4 according to a first factor (A) such that current I3+I4 corresponds to A*IPTAT. Factor A can be adjusted by changing the effective size of MN3 using the trimming methodology described above. FET MN2 is ratio sized to FET MN1 according to a second factor (B) such that current I2 corresponds to B*IPTAT. The current flowing down into node N10 corresponds to X*IZTAT as described with reference to FIG. 1. The input to the current buffer corresponds to the difference between X*IZTAT and A*IPTAT. The output of the current buffer is coupled to node N5 such that the current (IREF) that flows out at node N5 corresponds to the sum of B*IPTAT and (X*IZTAT−A*IPTAT), or ((X*IZTAT)+(B−A)*IPTAT).

The mirroring ration is adjusted to change the desired temperature slope according to the factors A, B, and X. FETS MN1–MN3 can be sized according to a binary ratio to adjustably cover the desired range of temperature slopes. In one example: factor A is in the range from (0.25+0.25*b1+0.5*b2+1*b3+ . . . +Y*bN) when FET MN4 is one quarter the size of FET MN1 and FET MN3 is an array of binary weighted transistors ranging in sizes starting at 0.25 of FET MN1 and up according to binary values b1 through bN. In another example, factor B corresponds to 0.75 when FET MN1 is size rationed to FET MN4 according to a 4 to 3 ratio. The current mirrors are preferably biased in the strong inversion operating region to improve matching performance between relative currents.

In the physical layout for the above described circuits, all the resistors involved are designed to have good matching qualities with respect to one another. Moreover, the operating temperatures for the PTAT generator, and resistors RSNS, RREF and RLOAD should be shared with one another. Careful layout consideration should be utilized in arranging the resistors and PTAT generator such that the operating temperature conditions for those circuits are similar in order to maintain proper operation of the reference voltage for the constant current control loop.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for controlling an output current that is delivered to a load, the apparatus comprising:
   a first transistor circuit that is coupled between a first node and a second node, wherein the first transistor circuit has a control terminal that is coupled to a third node;
   a sense resistor circuit that is coupled between the second node and the load, wherein the sense resistor circuit is arranged to generate a first voltage drop in response to the output current;
   a reference resistor circuit that is coupled between the second node and a fourth node, wherein the reference resistor circuit is arranged to generate a second voltage drop in response to a reference current;
   a first amplifier circuit that has an input that is coupled to the load, another input that is coupled to the fourth node, and an output that is coupled to third node, wherein the first amplifier circuit is arranged to cooperate with the first transistor circuit to control the output current such that the first voltage drop is approximately equal to the second voltage drop; and
   a temperature compensated reference current generator circuit that is coupled to the fourth node, wherein the temperature compensated reference current generator circuit is arranged to dynamically adjust the reference current such that the output current is stabilized with respect to an operating temperature of the apparatus.

2. The apparatus of claim 1, wherein the sense resistor and the reference resistor are arranged such that they share thermal characteristics that are similarly affected by the operating temperature of the apparatus.

3. The apparatus of claim 1, the temperature compensated reference current generator circuit comprising: a zero dependency on absolute temperature current generator circuit that is arranged to provide a portion of the reference current.

4. The apparatus of claim 3, the zero dependency on absolute current generator circuit further comprising a first current mirror bank that is arranged to provide the portion of the reference circuit.

5. The apparatus of claim 3, the zero dependency on absolute temperature current generator circuit comprising: a load resistor circuit, a second transistor circuit, and a second amplifier circuit, wherein the load resistor circuit is coupled to the second transistor circuit, and wherein the second amplifier circuit includes an input that is coupled to the load resistor, another input that is coupled to a reference voltage, and an output that is coupled to a control terminal of the second transistor circuit such that the operating current of the second transistor circuit is approximately independent of temperature variations.

6. The apparatus of claim 3, the zero dependency on absolute temperature current generator circuit comprising: a load resistor circuit, a second transistor circuit, a second amplifier circuit, and a reference circuit, wherein the load resistor circuit is coupled to the second transistor circuit, and wherein the second amplifier circuit includes an input that is coupled to the load resistor, another input that is coupled to a reference voltage from the reference circuit, and an output that is coupled to a control terminal of the second transistor circuit such that the operating current of the second transistor circuit is approximately independent of temperature variations.

7. The apparatus of claim 6, wherein the reference circuit is a band-gap circuit.

8. The apparatus of claim 1, the temperature compensated reference current generator circuit comprising: a zero dependency on absolute temperature current generator circuit that is arranged to provide a first portion of the reference current, and a proportional to absolute temperature current generator circuit that is arranged to provide a second portion of the reference current.

9. The apparatus of claim 8, wherein the first and second portions are adjusted by a trimming mechanism such that the temperature characteristics of reference current are dynamically adjusted to stabilize control of the output current.

10. The apparatus of claim 1, the temperature compensated reference current generator circuit comprising: a zero dependency on absolute temperature current generator (IZTAT) circuit, a summer circuit, and a proportional to absolute temperature current generator (IPTAT) circuit, wherein the summer circuit is arranged to provide the reference current (IREF) as a combination of the IPTAT current and the IZTAT current.

11. The apparatus of claim 10, the IPTAT circuit comprising: a current mirror bank that is arranged to adjust a level associated with the IPTAT current.

12. The apparatus of claim 11, the current mirror bank comprising an array of binary weighted transistors that are selectively enabled to adjust the level associated with the IPTAT current.

13. The apparatus of claim 1, the temperature compensated reference current generator circuit is arranged to provide the reference current (IREF) that is given by: IREF=X*IZTAT+Y*IPTAT, wherein IZTAT is a first current that has a zero dependency on absolute temperature, IPTAT is a second current that is proportional to absolute temperature, X is a first scaling factor, and Y is a second scaling factor.

14. The apparatus of claim 13, wherein scaling factors X and Y are selected to adjust the temperature characteristics of the reference current, and Y corresponds to at least one: of a positive number, a negative number, a positive integer, and a negative integer.

15. The apparatus of claim 13, wherein the load corresponds to at least one battery cell.

16. An apparatus for controlling an output current that is delivered to a load, the apparatus comprising:
a temperature compensation means that is arranged to provide a reference signal that is dynamically adjusted in response to changes in the operating temperature of the apparatus;
a current control means that is coupled between a power source and the load, wherein the current control means is couple the output current to the load in response to a control signal;
a comparison means that is arranged to sense a first signal and a second signal, and dynamically adjust the control signal until the first signal and the second signal are approximately matched;
a sense means that is coupled between the current control means and the load, wherein the sense means is arranged to provide the first signal such that the first signal is related to a level associated with the output current; and
a reference means that is coupled between the temperature compensation means and the sense means, wherein the reference means is arranged to generate the second signal.

17. The apparatus of claim 15, wherein the reference signal corresponds to a current (IREF) that is determined by the sum of (X*IZTAT) and (Y*IPTAT), wherein IZTAT is a first current that has a zero dependency on absolute temperature, IPTAT is a second current that is proportional to absolute temperature, X is a first scaling factor, and Y is a second scaling factor.

18. The apparatus of claim 17, the reference means further comprising a trimming mechanism that is arranged to adjust at least one of the first scaling factor (X) and the second scaling factor (Y) in response to a trimming control signal (TRIM), wherein the at least one adjusted scaling factor is adjusted by changing an effective reflection coefficient in at least one current mirror means.

19. An apparatus for providing a reference current to a resistor, comprising:
a first current generator circuit that is arranged to provide a first current (X*IZTAT) that has a zero dependency on absolute temperature;
a second current generator circuit that is arranged to provide a second current (Y*IPTAT) that is proportional to absolute temperature; and
a summer circuit that is arranged to provide the reference current (IREF) to the resistor as given by: IREF=X*IZTAT+Y*IPTAT.

20. The apparatus of claim 19, the first current generator circuit comprising:
an amplifier circuit and a first current mirror bank, the second current generator circuit comprising a second current mirror bank, wherein the amplifier circuit is arranged to control the first current mirror bank with a bang-gap voltage such that the first current (X*IZTAT) in relatively independent of absolute temperature, and wherein the first current mirror bank and the second current mirror bank are coupled to the summer circuit such that the first and second currents are combined to provide the reference current.

* * * * *

UNITED STATES PATENT AND TRADEMARK OFFICE
CERTIFICATE OF CORRECTION

| | | |
|---|---|---|
| PATENT NO. | : 6,958,590 B1 | Page 1 of 1 |
| APPLICATION NO. | : 10/713609 | |
| DATED | : October 25, 2005 | |
| INVENTOR(S) | : Jarmo Antero Vaananen | |

It is certified that error appears in the above-identified patent and that said Letters Patent is hereby corrected as shown below:

Add Figure 1 to the face page of patent

Column 3, Line 63: "current source 12" should read --current source I2--

Column 3, Line 63: "current source 13" should read --current source I3--

Column 3, Line 67: "(12-14) is controlled" should read--(I2-I4) is controlled

Column 3, Line 67: "sense circuit (I)" should read --sense circuit (I1)--

Signed and Sealed this

Nineteenth Day of September, 2006

JON W. DUDAS
*Director of the United States Patent and Trademark Office*